United States Patent [19]
Petit

[11] Patent Number: 5,091,145
[45] Date of Patent: Feb. 25, 1992

[54] GRID WITH HOLDING SPRINGS FOR A NUCLEAR FUEL ASSEMBLY

[75] Inventor: Bernard Petit, Saint Genis Laval, France

[73] Assignees: Framatome, Courbevoie; Compagnie Generale des Matieres Nucléaires, Velizy Villacoublay, both of France

[21] Appl. No.: 515,124

[22] Filed: Apr. 27, 1990

[30] Foreign Application Priority Data

Apr. 28, 1989 [FR] France ................................ 89 05724

[51] Int. Cl.⁵ ............................................. G21C 3/34
[52] U.S. Cl. .................................... 376/441; 376/462; 376/438
[58] Field of Search .................... 376/462, 438, 441; 29/723

[56] References Cited

U.S. PATENT DOCUMENTS

| | | | |
|---|---|---|---|
| 4,411,862 | 10/1983 | Leclercq et al. | 376/441 |
| 4,646,431 | 3/1987 | Vere et al. | 29/723 |
| 4,844,862 | 7/1989 | Sartor | 376/441 |

FOREIGN PATENT DOCUMENTS

| | | | |
|---|---|---|---|
| 384825A | 8/1990 | European Pat. Off. | 376/462 |
| 2639817 | 9/1978 | Fed. Rep. of Germany. | |

*Primary Examiner*—Brooks H. Hunt
*Assistant Examiner*—Meena Cheliah
*Attorney, Agent, or Firm*—Pollock, Vande Sande & Priddy

[57] ABSTRACT

A bracing grid suitable for use in a light water reactor has a plurality of mutually intersecting sets of plates defining cells which receive fuel rods. The plates carry springs for retaining the rods by friction. Each spring is formed has a U legs located each on one side of a plate, the branch being for contact on the elements in two mutually adjacent cells separated by the plate. The two legs are connected by a loop straddling the plate and are connected to each other by a weld at the base of the loop, through a window formed through the plate. The legs of each spring are also mutually connected by mechanical locking means which retain the two legs with respect to each other and with respect to the respective plate.

7 Claims, 3 Drawing Sheets

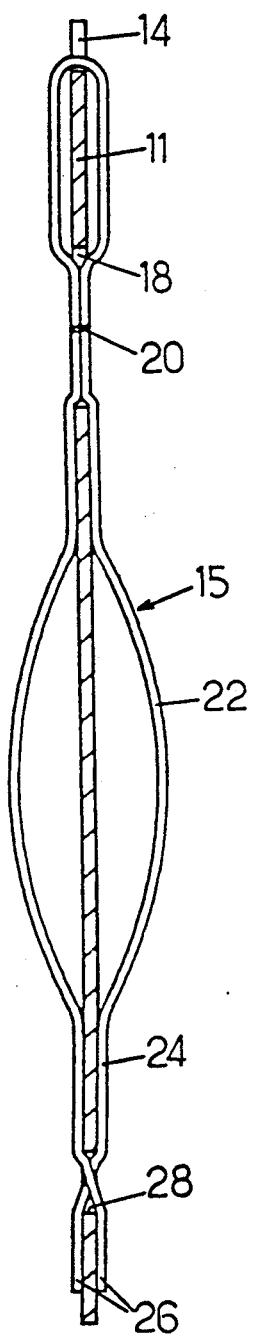
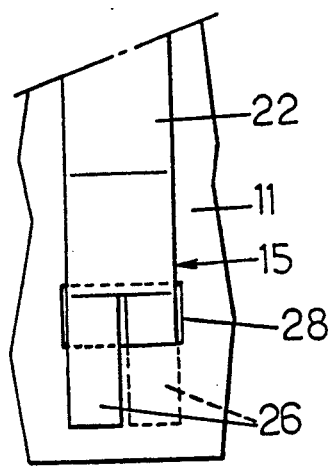
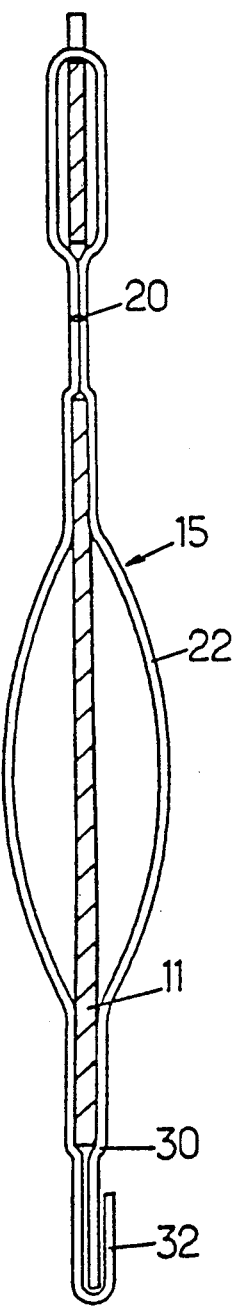
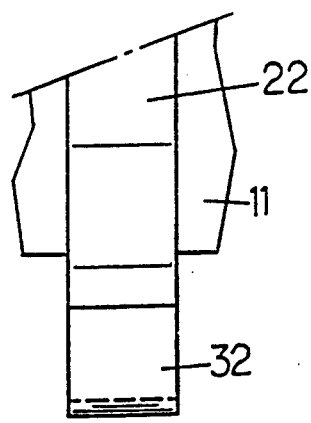

GRID WITH HOLDING SPRINGS FOR A NUCLEAR FUEL ASSEMBLY

BACKGROUND OF THE INVENTION

1. Technical Field

The invention relates to grids for holding and bracing fuel rods in a nuclear fuel assembly, of the type comprising a plurality of sets of mutually intersecting plates defining cells receiving fuel rods. Such grids are used for retaining the rods at the nodal points of an array with regular meshes, square or triangular. For retaining the grids on the rods so that the latter can slide in the case of differential expansion of the rods or expansion with respect to the guide tubes on which the grids are fixed, the plates have springs which apply the rods against a fixed boss of the plate opposite that which carries the spring or against another spring. Such grids are in particular used in light water cooled and moderated reactor assemblies.

2. Prior Art

Such grids are already known using double springs distinct from the plate, formed by a U-bent strip, having two active legs situated each on one side of a plate, for bearing on the rods occupying two mutually adjacent cells separated by the plate, connected together by a loop located over the plate and joined together by welding at the base of the loop. In particular, at the present time, grids are widely used comprising double springs whose legs are joined together by welding through two windows formed in the respective plate and situated on each side of a resilient mid-portion of the legs. A description of such springs and a machine for positioning them can be found for instance in document EP-A-0,163,568.

This type of grid in general gives good results. However, consequences of failure of the weld connecting together the ends of the legs remote from the loop (which has only a limited strength due to the small surface available for welding may be damageable. Following such a break, the free ends of the legs thus loosed may come into contact with the sheaths of the rod and damage them.

SUMMARY OF THE INVENTION

It is an object of the invention to provide an improved grid for a nuclear fuel assembly. It is a more specific object to eliminate or at least reduce the risks associated with failure of a weld.

To this end, there is provided a grid of the above-defined type, in which the legs of each spring are joined together by welding at the base of the loop and by means mechanically locking the legs with respect to each other and with respect to the respective plate, said means being located opposite the weld with respect to the resilient part of the legs and being arranged to hold an end portion of each of the two legs flat against the plate.

The locking means may be of different kinds. In a first embodiment, the ends of each leg have a width reduced to half the width of the current portion and the tongues thus formed pass through a window formed in the respective plate and crossing each other.

In another embodiment, one of the legs is longer than the other and is bent back by 180° over the end of the latter, which projects beyond the plate. In yet another embodiment, the ends of each leg are engaged under respective bridges formed by cutting out and locally pressing out the plate to each side of the median plane thereof.

BRIEF DESCRIPTION OF THE DRAWINGS

The invention will be better understood from the following description of particular embodiments, given by way of non-limitative examples. The description refers to the accompanying drawings.

FIG. 2 is a sectional view through a vertical plane showing a double action spring (with two active legs) according to a first embodiment of the invention;

FIG. 3 is a partial right hand view of FIG. 2, showing the end tongues of the spring;

FIGS. 4 and 5, similar to FIGS. 2 and 3, show another embodiment;

DETAILED DESCRIPTION OF PREFERRED EMBODIMENTS

Figure 1:
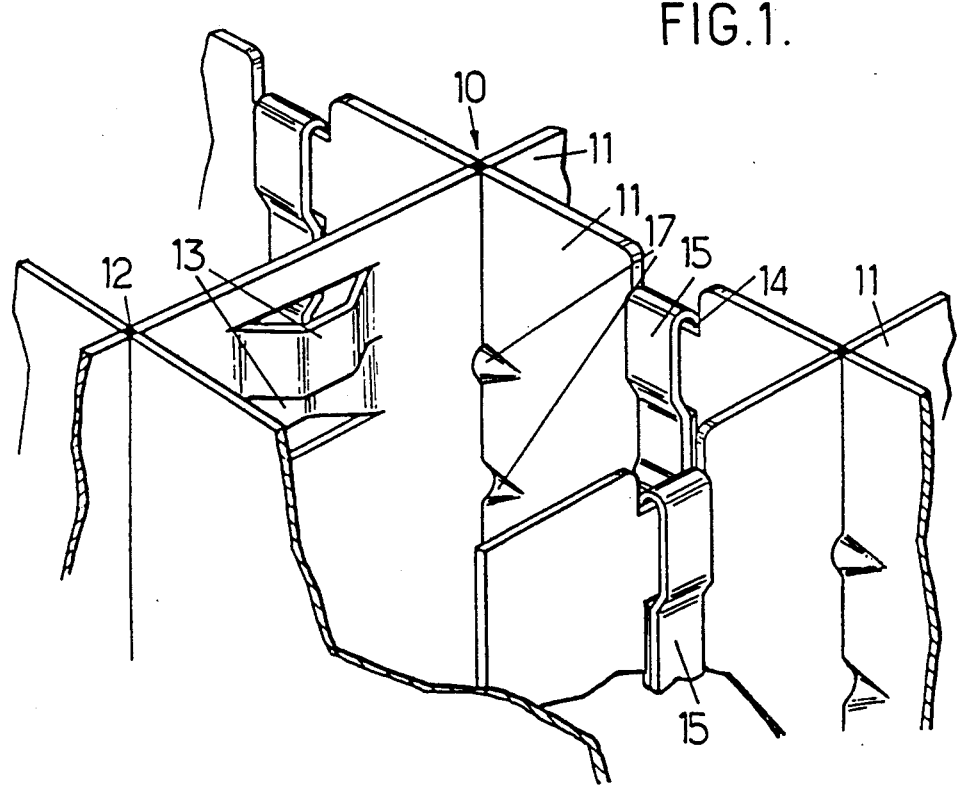
FIG. 1 is a perspective view of a fragment of a fuel assembly grid, having springs which may be in accordance with the invention.

Grid 10, a fraction of which is shown in FIG. 1, has a generally conventional construction which may for example be that described in the French Patent No. 2,474,229. It will therefore not be described in detail here.

Grid 10 is formed by mutually intersecting plates 11, generally made from a zirconium base alloy named "Zircaloy", having interengaging slots and welded at their connection points 12.

As shown, some of the plates 11 comprise bosses 13 supporting fuel rods (not shown) and each plate is formed with windows co-operating with springs applying the rods on bosses 13. In FIG. 1, double action springs 15 only are shown which are inserted in indentations 14 formed in the plates and opening onto one of the edges of the plate.

Springs 15 are formed by a strip of alloy having mechanical characteristics superior to those of the material forming the plates. Spring 15 shown in FIG. 2, of the double action U-shaped hairpin type, has two legs connected by a loop engaged into indentation 14. Both legs have the same shape. Each leg has a flat portion arranged for surface contact with the flat portion of the other leg through a window 18 and intended to be fixed by a weld 20. Beyond the flat welded portion, each leg further comprises a portion which bears flat against the plate, a curved portion 22 having the required resilience for urging the rod against a confronting boss and an end portion 24.

In the embodiment shown in FIGS. 2 and 3, the end portion has a zone which bears flat against the plate and an end portion whose width is half the width of the current portion of the leg, so as to form a tongue 26. The tongues each have two bends and they are placed so as to cross each other when passing through a window 28 formed in the respective plate.

A spring may be positioned in the following way: the U-shaped spring is inserted transversely to the plate (downwardly in FIG. 2) by sliding its legs on each side of plate 11. To force the ends of the legs to engage in window 28, the spring is retained under resilient compression while the loop is pushed downwards, so as to distort the legs and to place the tongues obliquely. Once insertion has begun, the spring may be moved without compression force, until the loop comes into contact with the edge of the plate, at the bottom of indentation 14. The two legs are then fixed together by welding at 20.

The spring shown in FIGS. 4 and 5 (where the elements corresponding to those already shown in FIGS. 2 and 3 bear the same reference number) differs from the preceding one by the construction of the end portions of the legs. The two legs have a length sufficient to project downwardly from the the plate 11. They have a double bend 30 at the position where the legs extend beyond the plate. One of the legs has a length appreciably greater than the other.

According to a specific assembly method, once the spring 15 has been inserted, the end of the longer leg is folded back through 180° so as to be applied on the end of the shorter leg.

A solution which may be more advantageous consists in weakening the top of the loop, for example by forming two notches therein, so that the portion of reduced width forms an articulation joint making it possible to move the two legs angularly apart in their plane by a sufficient amount for sliding the shorter leg between the plate and the previously turned down end of the longer leg. In this case, no bending step is necessary after the spring has been positioned. In both cases, each end portion of the legs is retained against the plate, in the portion between the resilient part 22 and the double bend 30.

Figure 6:
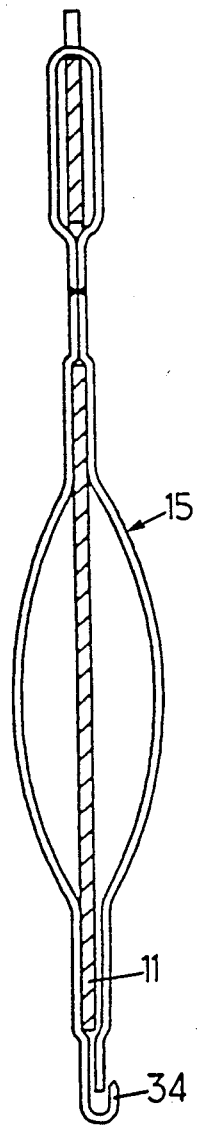
FIG. 6, similar to FIG. 4, shows a modification thereof.

The modification shown in FIG. 6 only differs from that of FIGS. 4 and 5 by the length of the leg portions projecting below plate 11. The ends are shorter and the portion of the longer leg bent back at 180° forms a simple retaining hook 34, forming a snap action connection.

Figure 9:
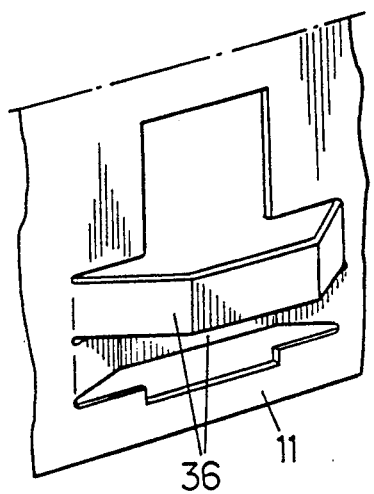
FIG. 9 is an isometric view of a fraction of a plate formed with bridges which can be used for receiving a spring of the kind shown in FIGS. 7 and 8.
Figure 7:
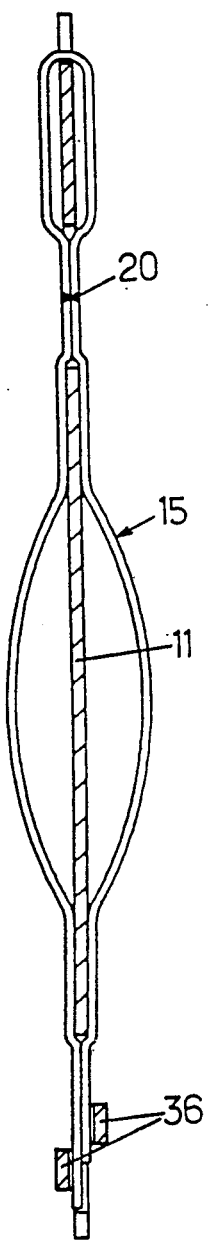
FIGS. 7 and 8, similar to FIGS. 2 and 3, show yet another embodiment.
Figure 8:
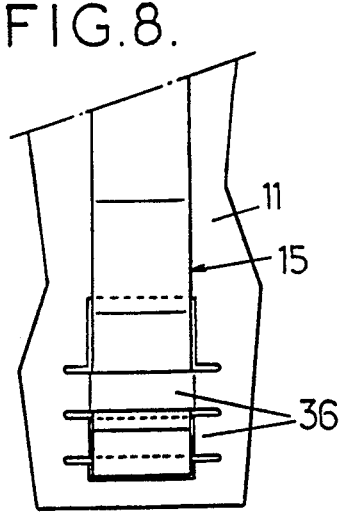

The spring shown in FIGS. 7 and 8 differs from that of FIG. 2 in that the end portions of the legs are flat and applied against each other. They are engaged between two bridges 36 (FIGS. 7 to 9) formed by cutting out two strips in the metal sheet forming the plate and locally punching them out in mutually opposite directions. The bridges advantageously have a trapezoidal shape (FIG. 9) facilitating insertion of the ends of the legs, the bottom of the bridges having a width substantially equal to that of the legs for accurately holding the latter in position. One of the legs may be longer than the other to facilitate insertion of the ends between the bridges, when the legs are slid along mutually opposite faces of the plate.

Other modifications of the invention are further possible and it may be applied to springs of dissymmetric construction, having a single active leg (i.e. a spring forming leg) while the other leg provides a rotatable abutment.

I claim:

1. A grid for holding and bracing fuel elements in a nuclear fuel assembly, comprising:
    at least two sets of plates, the plates of a same one of said sets being mutually parallel and intersecting the plates of the other set for defining fuel element receiving cells, and
    a plurality of springs carried by said plates, each of said springs being formed as a U bent strip having two active legs formed with respective resilient parts, situated each on one side of a same plate, for bearing on fuel elements occupying two mutually adjacent cells separated by the plate and connected together by a loop located over the plate,
    wherein the legs of each of said springs are joined together by a single weld located at the base of the loop and by means mechanically locking the legs with respect to each other and with respect to the respective plate, said means being located opposite the weld with respect to the resilient part of the legs and being arranged to hold an end portion of each of the two legs flat against the plate.

2. Grid according to claim 1, wherein the end portion of each leg has a width which is approximately half the common width of current portions of said legs, whereby the end portions constitute tongues, and wherein windows are formed in the plates, each of said windows being arranged for receiving two end portions of a same one of said springs which cross each other in the window for constituting said locking means.

3. Grid according to claim 1, wherein one of the legs is longer than the other and is bent back by 180° over the end of the latter, which projects beyond the plate for constituting said locking means.

4. Grid according to claim 3, wherein the loop is locally weakened for constituting an articulated joint of sufficient flexibility for authorizing an angular movement of the two legs with respect to each other in their own plane.

5. Grid according to claim 1, wherein the end portions of both legs of each of said springs are engaged under respective bridges formed by cutting out and locally pressing out the plate on each side of a median of the plate.

6. A grid for holding and bracing fuel elements in a nuclear fuel assembly, comprising:
    at least two sets of plates, the plates of a same one of said sets being mutually parallel and intersecting the plates of the other set so as to define cells, and
    a plurality of springs carried by said plates, each of said springs being formed as a U-bent strip having two active legs formed with respective resilient parts, situated each on one side of a same one of said plates, and connected together by a loop located over the respective plate,
    wherein the legs of each of said springs are joined together by only one weld located at the base of the loop, formed through a respective first window in the respective plates,
    wherein the end portion of each leg has a width which is approximately half the common width of current portions of said legs, whereby the end portions constitute tongues, and
    wherein second windows are formed in said plates and arranged each for receiving the end portions of the two legs of a same of said springs which cross each other in the window for constituting mechanical locking means and which terminate as portions located flat against the respective plate.

7. A grid for holding and bracing fuel elements in a nuclear fuel assembly, comprising:
    at least two sets of plates, the plates of a same one of said sets being mutually parallel and intersecting the plates of the other set so as to define cells, and
    a plurality of springs carried by said plates, each of said springs being formed as a U-bent strip having two active legs formed with respective resilient parts, situated each on one side of a same one of said plates, and connected together by a loop located over the respective plate, wherein the legs of each of said springs are joined together by a single weld at the base of the loop, through a respective window in the respective plate, and wherein one of the legs is longer than the other leg and is bent back by 180° over the end of the latter which projects beyond the plate for constituting mechanical locking means holding and portions of each of the two legs flat against a respective side of the respective plate.

* * * * *